(12) United States Patent
McGrath et al.

(10) Patent No.: US 8,491,262 B2
(45) Date of Patent: Jul. 23, 2013

(54) METHOD FOR SHUT DOWN OF A WIND TURBINE HAVING ROTOR BLADES WITH FAIL-SAFE AIR BRAKES

(75) Inventors: Edward Lee McGrath, Greer, SC (US); Robert William Ridgway, Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/282,631

(22) Filed: Oct. 27, 2011

(65) Prior Publication Data

US 2012/0134803 A1 May 31, 2012

(51) Int. Cl.
F03D 7/04 (2006.01)

(52) U.S. Cl.
USPC ........ 416/1; 416/31; 416/32; 416/36; 416/37; 416/41; 416/48; 416/169 R; 416/500; 416/23

(58) Field of Classification Search
USPC .................. 416/1, 31, 32, 36, 37, 41, 44, 47, 416/48, 169 R, 500, 23, 24; 415/119
See application file for complete search history.

(56) References Cited

U.S. PATENT DOCUMENTS

| | | | |
|---|---|---|---|
| 3,795,375 A * | 3/1974 | Lemnios | 244/17.27 |
| 4,082,479 A | 4/1978 | Rangi et al. | |
| 4,160,170 A | 7/1979 | Harner et al. | |
| 4,180,372 A | 12/1979 | Lippert, Jr. | |
| 4,189,648 A | 2/1980 | Harner | |
| 4,193,005 A | 3/1980 | Kos et al. | |
| 4,204,805 A | 5/1980 | Bolie | |
| 4,247,252 A | 1/1981 | Seki et al. | |
| 4,355,955 A | 10/1982 | Kisovec | |
| 4,422,820 A | 12/1983 | Kirsch et al. | |
| 4,431,375 A | 2/1984 | Carter, Jr. et al. | |
| 4,435,646 A | 3/1984 | Coleman et al. | |
| 4,490,093 A * | 12/1984 | Chertok et al. | 416/32 |
| 4,500,257 A | 2/1985 | Sullivan | |

(Continued)

FOREIGN PATENT DOCUMENTS

DE 196 29 168 C1 10/1997
DE 10 2004 005 169 B3 11/2005

(Continued)

OTHER PUBLICATIONS

Brochure—WM 17S from Wind Matic.

(Continued)

*Primary Examiner* — Christopher Verdier
(74) *Attorney, Agent, or Firm* — Dority & Manning, P.A.

(57) ABSTRACT

A method for shutdown of a wind turbine having one or more wind turbine blades includes detecting an operational condition of the wind turbine that calls for an expedited or emergency shutdown of the wind turbine by a manner other than normal pitch control shutdown. Upon detection of the operational condition, one or more air brake flaps configured on each of the turbine blades is deployed by removing power to a fail-safe actuator operatively coupled to each of the air brake flaps. The fail-safe actuator is configured to hold the respective air brake flap at a retracted position relative to a suction side of the turbine blade in a powered state of the fail-safe actuator and to release the air brake flap for automatic deployment to an open position upon loss of power to the fail-safe actuator.

12 Claims, 7 Drawing Sheets

U.S. PATENT DOCUMENTS

| | | | |
|---|---|---|---|
| 4,504,192 A | 3/1985 | Cyrus et al. | |
| 4,522,561 A | 6/1985 | Carter, Jr. et al. | |
| 4,522,564 A | 6/1985 | Carter, Jr. et al. | |
| 4,557,666 A | 12/1985 | Baskin et al. | |
| 4,565,929 A | 1/1986 | Baskin et al. | |
| 4,575,309 A | 3/1986 | Brown | |
| 4,613,282 A | 9/1986 | Wood | |
| 4,659,284 A | 4/1987 | Wood | |
| 4,664,596 A | 5/1987 | Wood | |
| 4,692,095 A | 9/1987 | Lawson-Tancred | |
| 4,715,782 A | 12/1987 | Shimmel | |
| 4,815,936 A | 3/1989 | Stoltze et al. | |
| 5,106,265 A | 4/1992 | Holzem | |
| 5,354,175 A | 10/1994 | Coleman et al. | |
| 5,391,926 A | 2/1995 | Staley et al. | |
| 5,527,151 A | 6/1996 | Coleman et al. | |
| 5,527,152 A | 6/1996 | Coleman et al. | |
| 5,570,859 A | 11/1996 | Quandt | |
| 5,907,192 A | 5/1999 | Lyons et al. | |
| 6,254,197 B1 | 7/2001 | Lading et al. | |
| 6,265,785 B1 | 7/2001 | Cousineau et al. | |
| 6,420,795 B1 | 7/2002 | Mikhail et al. | |
| 6,566,764 B2 | 5/2003 | Rebsdorf et al. | |
| 6,784,566 B2 | 8/2004 | Thomas | |
| 6,819,086 B2 | 11/2004 | Wobben | |
| 6,856,038 B2 | 2/2005 | Rebsdorf et al. | |
| 6,856,040 B2 | 2/2005 | Feddersen et al. | |
| 6,933,625 B2 | 8/2005 | Feddersen et al. | |
| 7,015,595 B2 | 3/2006 | Feddersen et al. | |
| 7,063,501 B2 | 6/2006 | Selsam | |
| 7,075,192 B2 | 7/2006 | Bywaters et al. | |
| 7,109,600 B1 | 9/2006 | Bywaters et al. | |
| 7,119,453 B2 | 10/2006 | Bywaters et al. | |
| 7,183,665 B2 | 2/2007 | Bywaters et al. | |
| 7,218,012 B1 | 5/2007 | Edenfeld | |
| 7,276,807 B2 | 10/2007 | Luetze et al. | |
| 7,293,959 B2 * | 11/2007 | Pedersen et al. | 416/23 |
| 7,303,369 B2 | 12/2007 | Rowan et al. | |
| 7,321,221 B2 | 1/2008 | Bucker et al. | |
| 7,332,837 B2 | 2/2008 | Ward et al. | |
| 7,397,145 B2 | 7/2008 | Struve et al. | |
| 7,419,356 B2 | 9/2008 | Stiesdal | |
| 7,431,567 B1 | 10/2008 | Bevington et al. | |
| 7,434,636 B2 | 10/2008 | Sutherland | |
| 7,436,083 B2 | 10/2008 | Shibata et al. | |
| 7,458,776 B2 | 12/2008 | Llorente Gonzalez et al. | |
| 7,471,007 B2 | 12/2008 | Buker et al. | |
| 7,488,155 B2 | 2/2009 | Barbu et al. | |
| 7,502,215 B2 | 3/2009 | Krug et al. | |
| 7,513,742 B2 | 4/2009 | Rogall et al. | |
| 7,591,635 B2 | 9/2009 | Ryu et al. | |
| 7,592,766 B2 | 9/2009 | Patel et al. | |
| 7,617,741 B1 | 11/2009 | Lowe-Wylde | |
| 7,632,068 B2 | 12/2009 | Bak et al. | |
| 7,643,928 B2 | 1/2010 | Soucy | |
| 7,677,862 B2 | 3/2010 | Boatner | |
| 7,709,972 B2 | 5/2010 | Arinaga et al. | |
| 7,745,948 B2 | 6/2010 | Kerber | |
| 7,786,608 B2 | 8/2010 | Menke | |
| 7,802,469 B2 | 9/2010 | Staedler et al. | |
| 7,808,121 B1 | 10/2010 | Glynn | |
| 7,816,801 B2 | 10/2010 | Guang et al. | |
| 7,821,147 B2 | 10/2010 | Du Bois | |
| 7,822,524 B2 | 10/2010 | Tabata et al. | |
| 7,848,858 B2 | 12/2010 | Tabata et al. | |
| 7,869,976 B2 | 1/2011 | Larsen et al. | |
| 7,884,493 B2 | 2/2011 | Buskirk et al. | |
| 7,887,284 B2 | 2/2011 | Merswolke et al. | |
| 7,891,941 B2 | 2/2011 | Bevington et al. | |
| 7,941,259 B2 | 5/2011 | Tabata et al. | |
| 7,944,067 B2 | 5/2011 | Kammer et al. | |
| 7,948,100 B2 | 5/2011 | Nies et al. | |
| 2009/0074574 A1 | 3/2009 | Godsk et al. | |
| 2009/0285682 A1 | 11/2009 | Baker et al. | |
| 2011/0142642 A1 * | 6/2011 | McGrath et al. | 416/135 |
| 2011/0223033 A1 | 9/2011 | Wang et al. | |

FOREIGN PATENT DOCUMENTS

| | | |
|---|---|---|
| DE | 10 2009 026 131 B3 | 11/2010 |
| EP | 0 350 425 A1 | 1/1990 |
| EP | 0 761 964 A1 | 3/1997 |
| EP | 2 085 610 A1 | 8/2009 |

OTHER PUBLICATIONS

Brochure—WM 15S from Wind Matic.

Article—"Wind Turbine Test, Wind Matic WM 15S", Rise National Laboratory, Denmark, Jul. 1986.

* cited by examiner

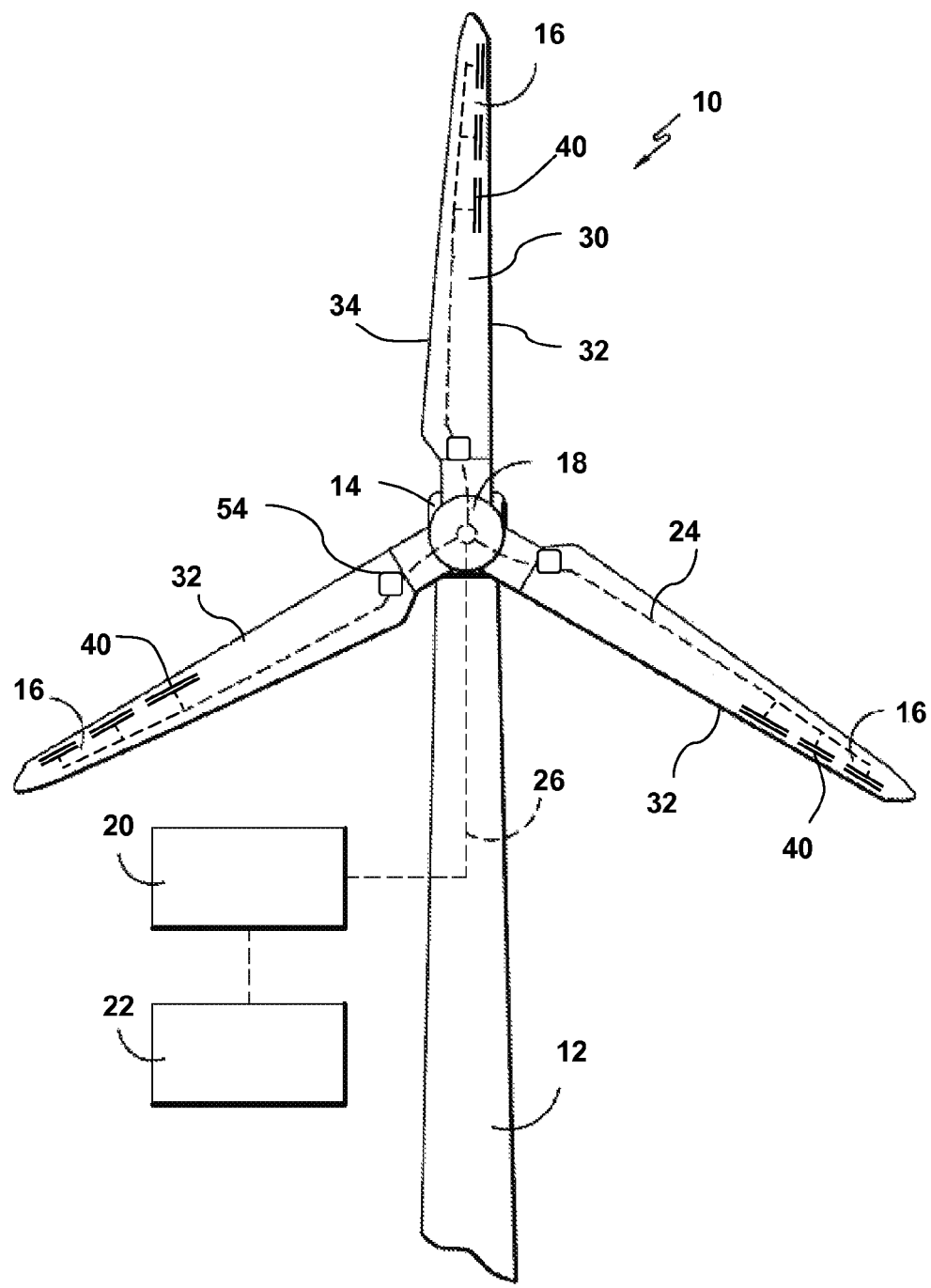
Fig. -1-

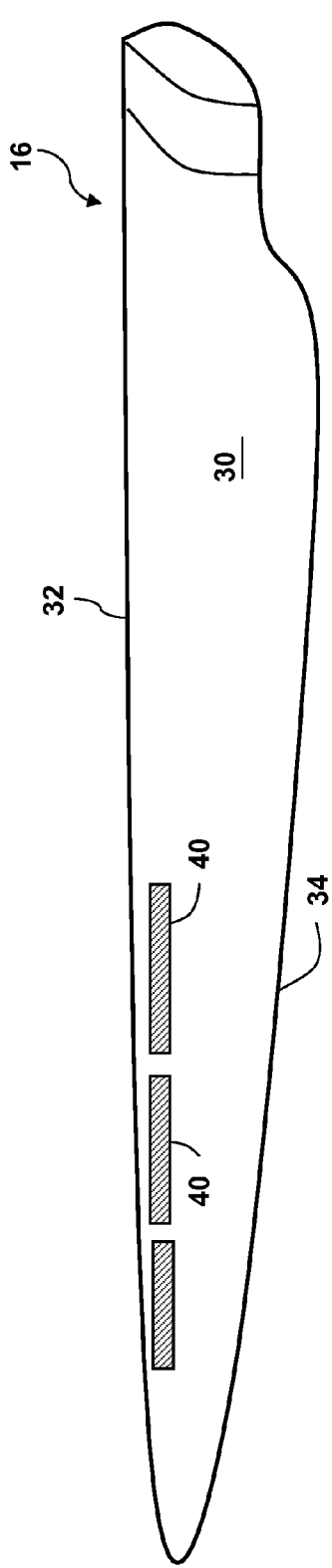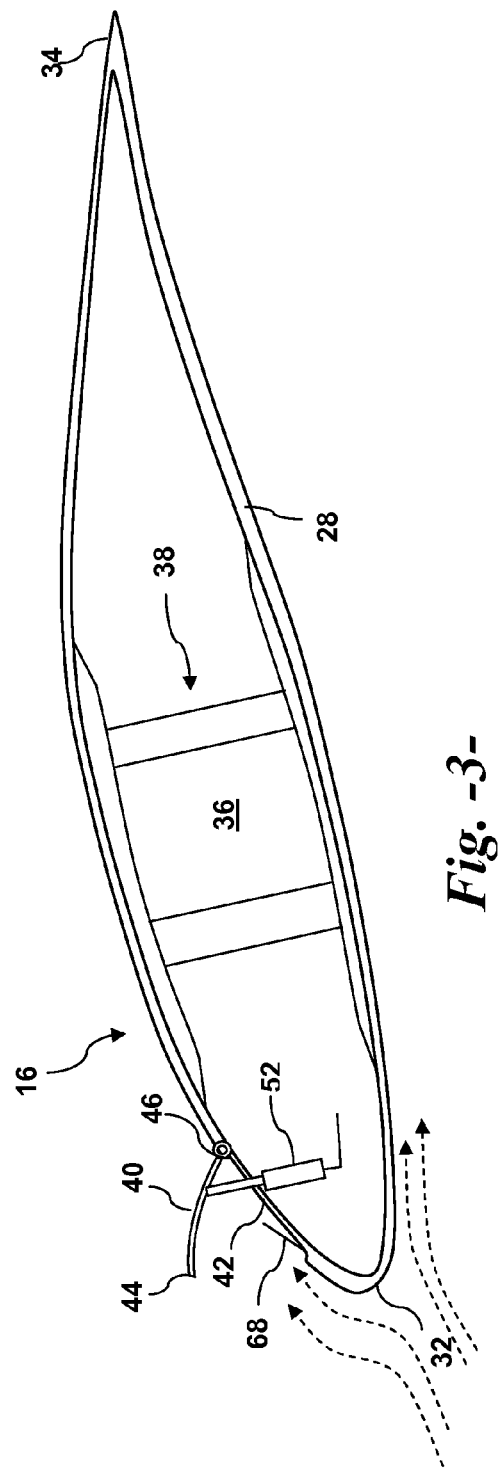

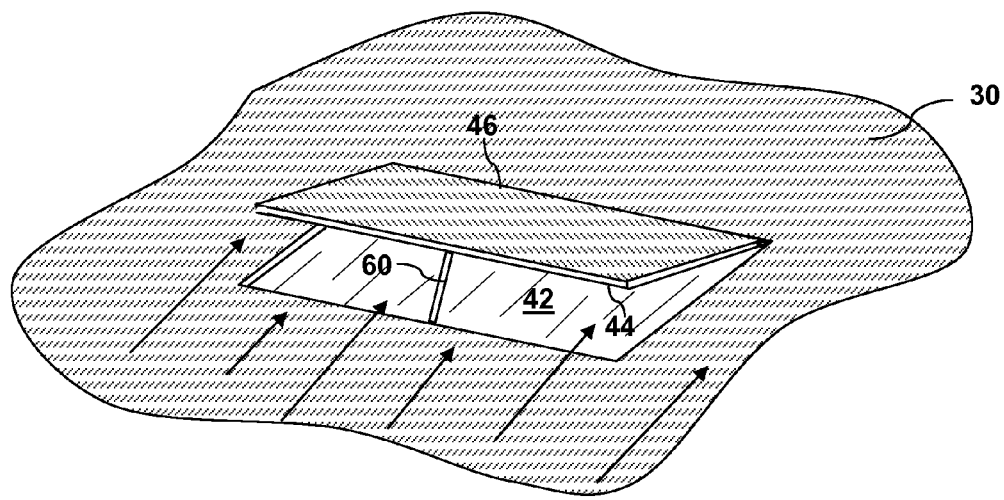
*Fig. -4-*
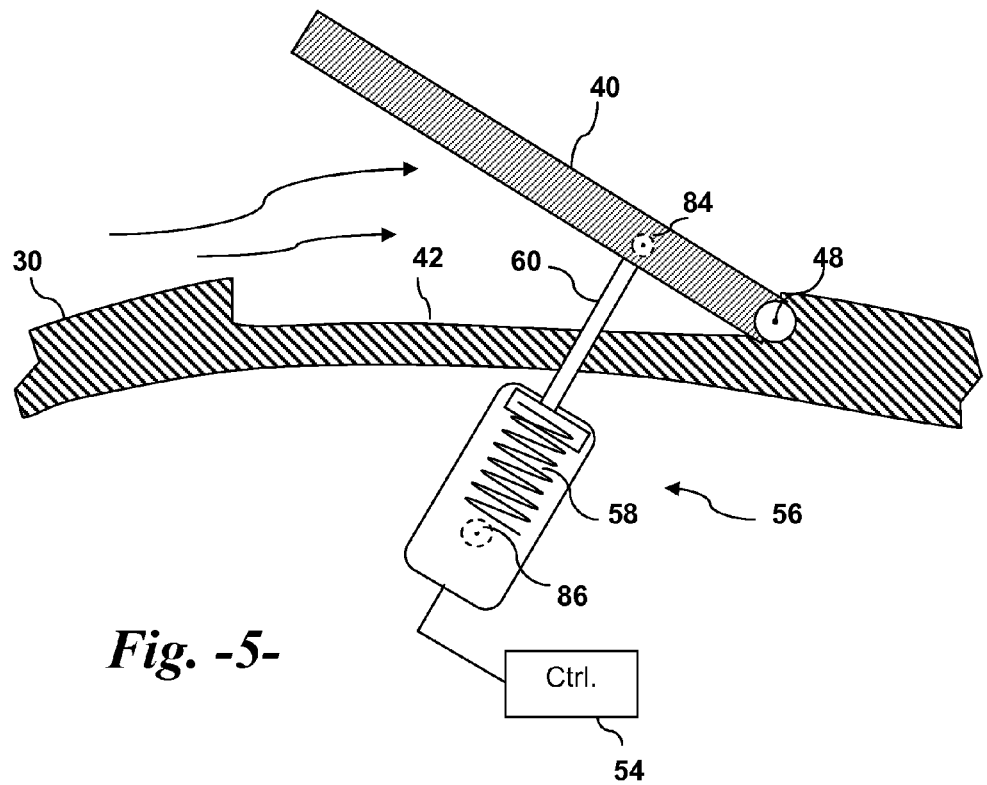
*Fig. -5-*

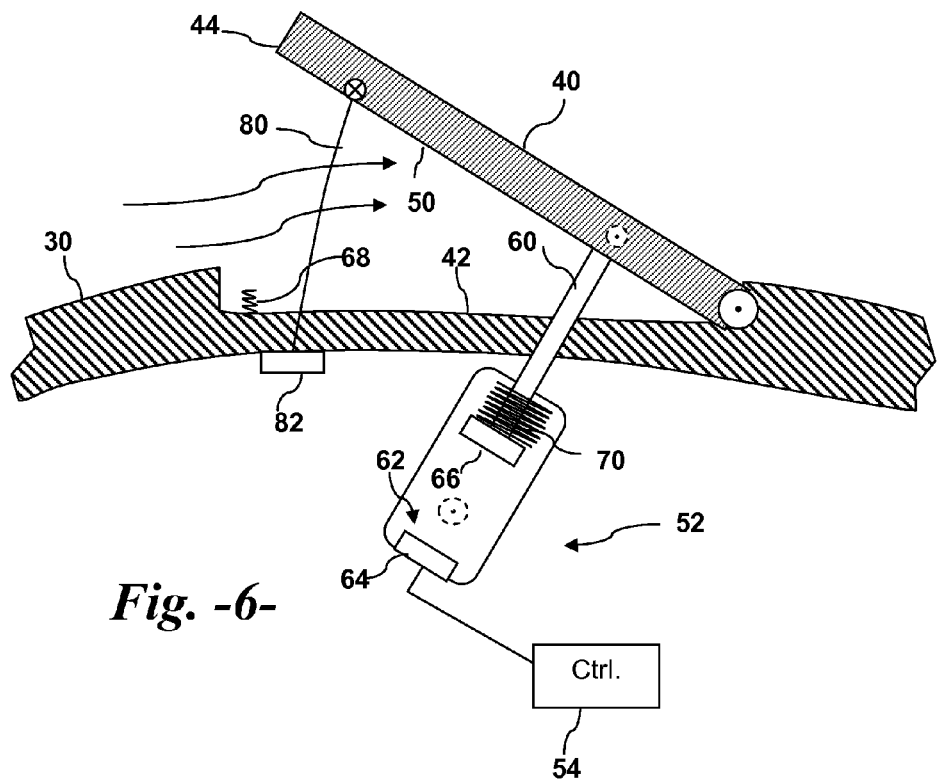
*Fig. -6-*
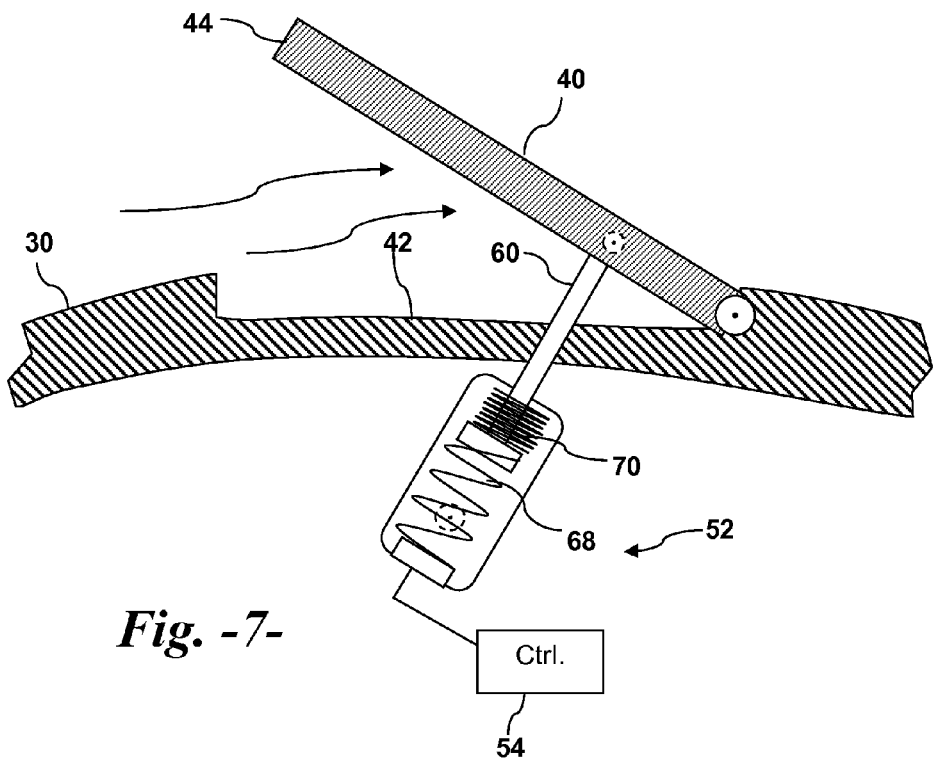
*Fig. -7-*

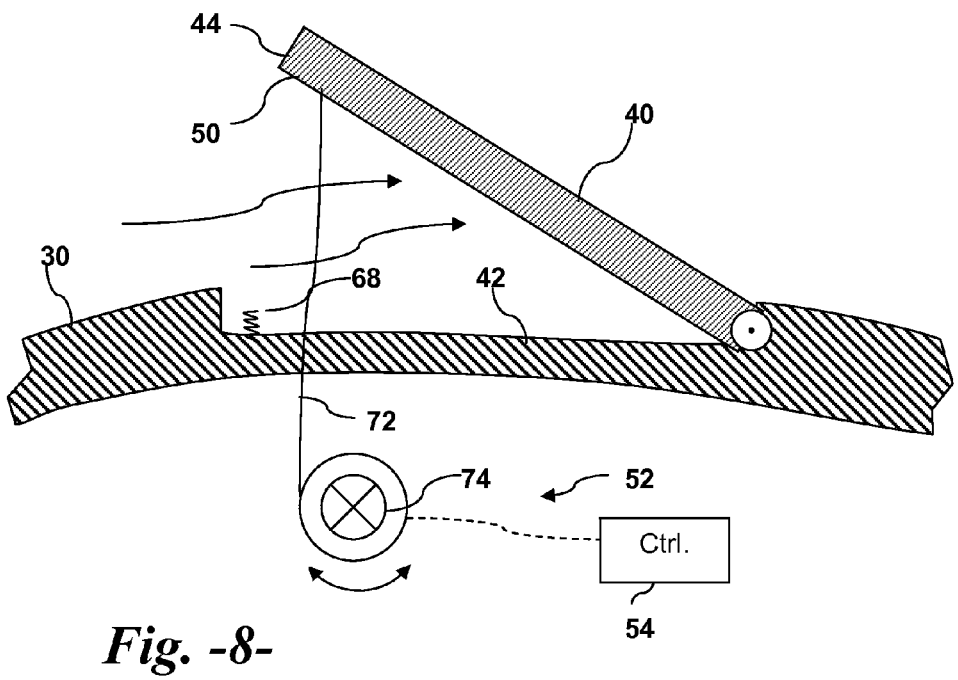
Fig. -8-
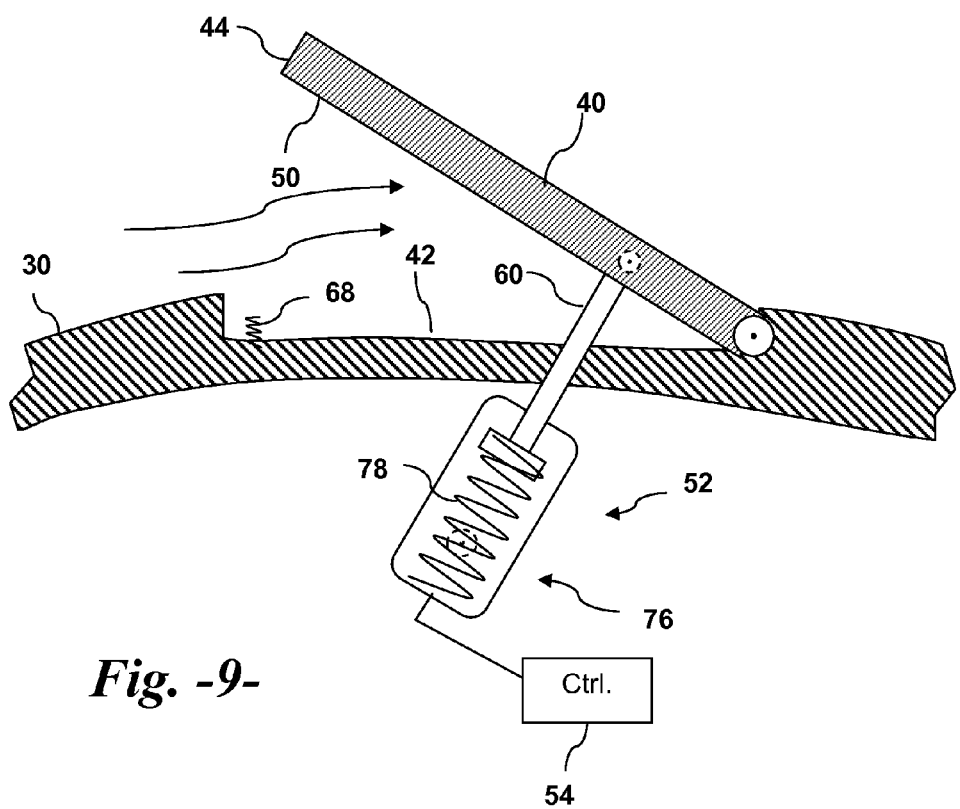
Fig. -9-

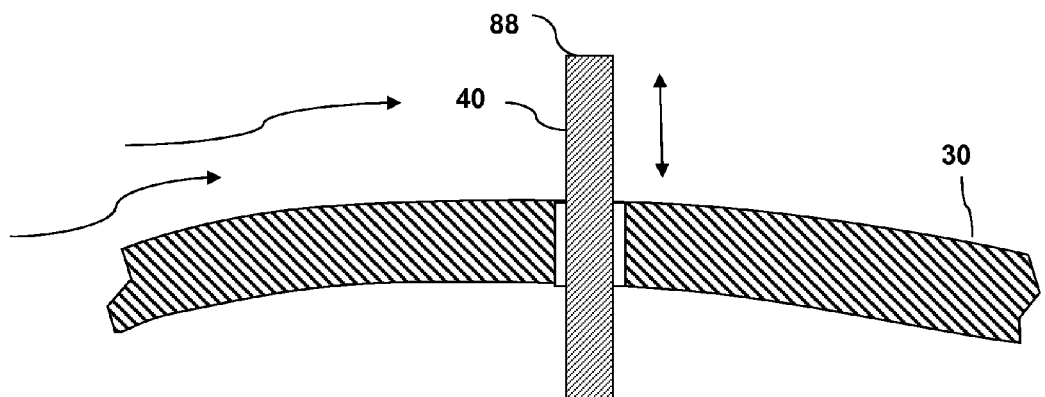
*Fig. -10-*
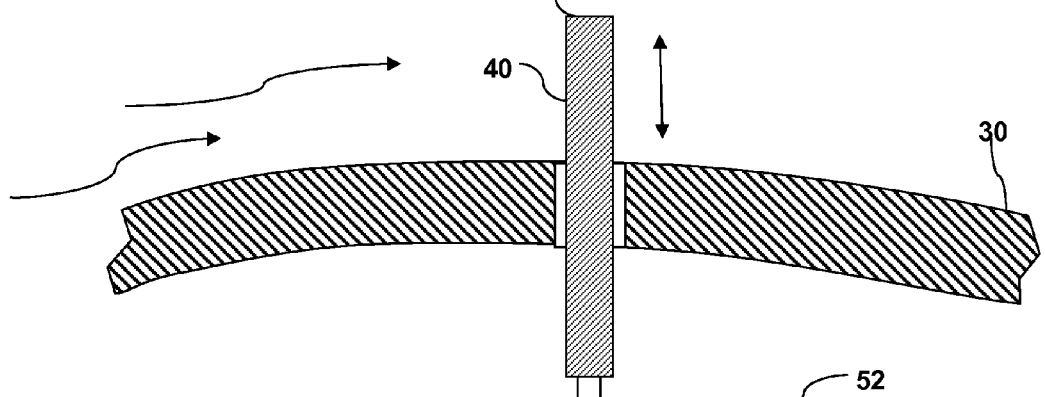
*Fig. -11-*

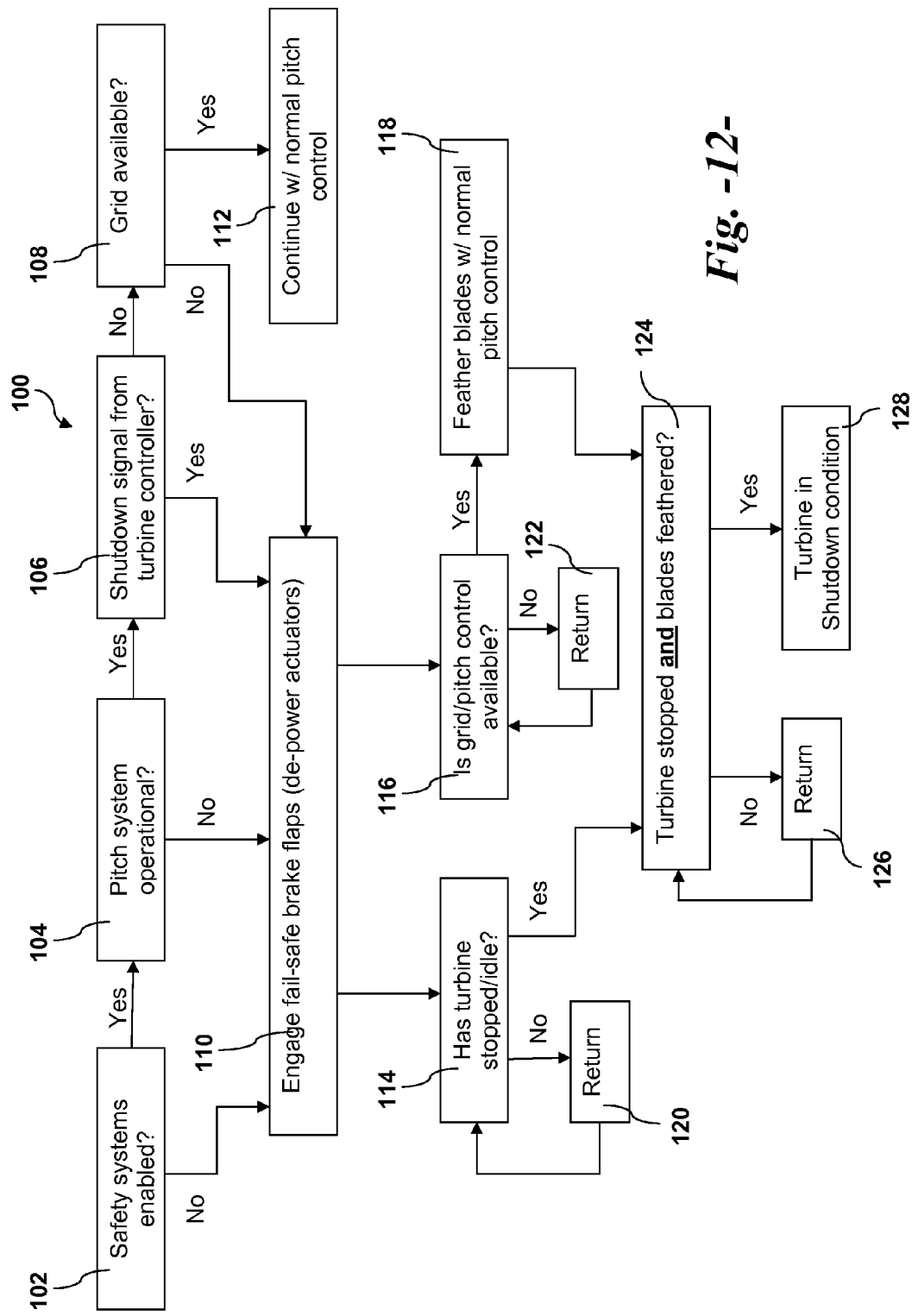

METHOD FOR SHUT DOWN OF A WIND TURBINE HAVING ROTOR BLADES WITH FAIL-SAFE AIR BRAKES

FIELD OF THE INVENTION

The present subject matter relates generally to wind turbines, and particularly to wind turbine rotor blades having one or more air brake flaps or "spoilers" that function as an air brake.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines, including increasing the length and surface area of the rotor blades. However, the magnitude of deflection forces and loading of a rotor blade is generally a function of blade length, along with wind speed, turbine operating states, blade stiffness, and other variables. This increased loading not only produces fatigue on the rotor blades and other wind turbine components, but may also increase the risk of a sudden catastrophic failure of the rotor blades, for example when excess loading causes deflection of a blade resulting in a tower strike. Load control is thus a crucial consideration in operation of modern wind turbines. Active pitch control systems are widely used to control the load on the rotor blades by varying the pitch of the blades.

The emergency shut down system on many wind turbines uses the active pitch control system to rapidly feather the blades in an emergency condition to reduce lift and stop the rotor. However, this type of shut down system is not without drawbacks. For example, a back-up power supply (e.g., a battery bank) must be maintained (charged) and placed in connection with a motor to feather the blades in the event of loss of power to the pitch control system. With hydraulic pitch control systems, a loss of power results in loss of hydraulic pressure and the blades feathering to a safe position via springs. However, hydraulic systems add significantly to the cost and maintenance of the wind turbine and the springs required to move the entire blade are large and costly.

U.S. Pat. No. 4,692,095 describes wind turbine blades with active spoilers on the low pressure side of the blade that rapidly deploy to control an overspeed condition. The spoilers are connected to an electrically operated clutch, which normally holds the spoilers in a flush-mount position. In an overspeed condition, the clutch releases the rope and the spoiler opens via a spring. The spoiler, however, opens against the force of the airflow over the blade and the spring must be of sufficient size and strength to hold the spoiler open as the rotor slows. Likewise, the clutch must be of sufficient size and power to retract the spoiler against the force of the spring.

Accordingly, the industry would benefit from an improved emergency shut down system for wind turbine rotor blades.

BRIEF DESCRIPTION OF THE INVENTION

Aspects and advantages of the invention will be set forth in part in the following description, or may be obvious from the description, or may be learned through practice of the invention.

In one aspect, a wind turbine rotor blade is provided with a pressure side joined to a suction side at a leading edge and a trailing edge and defining an internal cavity of the blade. One or more air brake flaps are flush-mounted within a recess in the suction side and is actuatable from a retracted position within the recess to an open position wherein the air brake flap extends transversely from the suction side. The air brake flap has a hinged end and a free end that is adjacent to the leading edge such that in the open position, the air brake flap is biased to stay in the open position by airflow over the suction side. A fail-safe actuator is operatively coupled to the air brake flap and is configured to hold the air brake flap at the retracted position in a powered state of the actuator. The actuator releases the air brake flap to the open position upon loss of power to the actuator.

In a particular embodiment, a controller is in communication with the actuator and depowers the actuator in response to a shutdown condition signal (for example from a load sensor) to cause the air brake flap to deploy.

The actuator may be variously configured. For example, in one embodiment, the actuator may be an electrically controlled spring-extend actuator having a spring biased rod that is coupled to and drives the air brake flap to the open position upon loss of electric power to the actuator.

In another embodiment, the actuator may include a lock that retains the air brake flap in the retracted position and releases the air brake flap upon loss of power to the lock.

In still a further embodiment, a biasing element may be configured with the air brake flap to generate an initial movement of the air brake flap out of the recess upon loss of power to the actuator, whereby air flow over the suction side subsequently moves the air brake flap to the open position. For example, the actuator may include a rod coupled to the air brake flap, with the biasing element including a spring disposed so as to act on the rod. A return spring may be disposed so as to return the rod to the retracted position of the air brake flap in opposition to the biasing spring once the blade has slowed or stopped.

In yet another embodiment, the actuator may include a lock that retains the air brake flap in the retracted position and releases the air brake flap upon loss of power to the lock, with the biasing element acting on the air brake flap upon release of the lock. For example, the biasing element may be a spring disposed within the recess so as to act directly on an underside of the air brake flap upon release of the lock.

In yet another embodiment, the actuator may include a cable attached to an underside of the air brake flap and wound on an electrically controlled clutch, wherein upon loss of power, the clutch releases and the biasing element moves the air brake flap out of the recess to a position such that air flow over the suction side subsequently moves the air brake flap to the open position.

In other embodiments, the actuator may include an electrically controlled shape memory spring coupled to a rod that drives the air brake flap to the open position upon loss of electric power to the shape memory spring. Upon restoration of power, the spring retracts and pulls the air brake flap to the retracted position.

In another embodiment, a stop cord may be configured with the air brake flap to define a range of movement of the air brake flap to the open position independent of the actuator.

The present subject matter also encompasses an embodiment of a wind turbine blade that includes a vertically deployable air brake flap having a top end flush mounted within the suction side. The air brake flap is actuatable from a retracted position within the internal cavity of the blade to an open position wherein the air brake flap extends generally vertically from the suction side. A fail-safe actuator is operatively coupled to the air brake flap and is configured to hold the air brake flap at the retracted position in a powered state of the actuator, and to release and move the air brake flap to the open position upon loss of power to the actuator.

The actuator may be variously configured in the vertically deployable air brake flap. For example, the actuator may be an electrically controlled shape memory spring actuator that drives the air brake flap to the open position upon loss of electric power to the shape memory spring actuator, and pulls the air brake flap back to the retracted position upon subsequent supply of power to the shape memory spring actuator. In an alternate embodiment, the actuator may comprise a lock that retains the air brake flap in the retracted position and releases the air brake flap upon loss of power to the lock. The actuator may further include a spring disposed so as to move the air brake flap to the open position upon release of the lock. A return drive mechanism, for example a gear drive or any other suitable mechanical, electrical, or pneumatic drive may be configured to move said air brake flap to said refracted position.

The invention also encompasses a wind turbine having one or more turbine blades configured with the air brake flaps as described herein.

The present invention also encompasses various method embodiments for shutdown of a wind turbine having one or more wind turbine blades with air brake flaps as set forth herein. A particular method includes detecting an operational condition of the wind turbine that calls for an expedited or emergency shutdown of the wind turbine by means other than normal pitch control shutdown. Upon detection of the operational condition, one or more air brake flaps configured on each of the turbine blades is deployed by removing power to a fail-safe actuator operatively coupled to each of the air brake flaps. The fail-safe actuators are configured to hold the respective air brake flap at a retracted position relative to a suction side of the turbine blade in a powered state of the fail-safe actuator and to release the air brake flap for automatic deployment to an open position upon loss of power to the fail-safe actuator.

The detected operational condition that initiates the shutdown may be any one or combination of conditions. For example, in one embodiment, the detected operational condition may indicate that a safety system operationally configured with the wind turbine is not enabled. The safety system may be configured via one or redundant "safety chains" to initiate braking of the wind turbine for a rotor or generator overspeed condition, excessive vibration, failure of the pitch control system, or controller system failure. In another embodiment, the detected operational condition may indicate loss or malfunction of the pitch control system operationally configured with the wind turbine, irrespective of the status of the safety system.

In a further embodiment, the detected operational condition may be generation of an emergency shutdown command (for any reason) from a wind turbine controller operatively configured with the wind turbine.

Wind turbines are generally configured to supply electricity to a distribution grid. In this case, the detected operational condition may indicate loss of the grid or ability to supply to the grid.

After deployment of the air brake flaps, the method may further include detecting when the turbine rotor has stopped and whether the turbine blades can be feathered with pitch control to a neutral position. If these conditions are met, the method may further include feathering the blades to the neutral position and placing the wind turbine is a shutdown state. In the shutdown state, power may be supplied to the fail-safe actuators to retract the air brake flaps.

Depending on the configuration of the air brake flaps, certain of the method embodiments may include providing an initial motive force to the air brake flaps upon removing power to the fail-safe actuators to move the air brake flaps to an initial position relative to the suction side of the turbine blade so that airflow over the suction side subsequently acts on the air brake flaps and moves the air brake flaps to a fully deployed position. The air brake flaps may be pivotally mounted to the suction side of the turbine blade in these embodiments.

In embodiments wherein the air brake flaps have a top end that is flush mounted with the suction side of the turbine blade in the retracted position of the air brake flaps and are deployable in a generally perpendicular direction from the suction side of the turbine blade, the method may include providing a sufficient motive force to the air brake flaps upon removing power to the fail-safe actuators to move the air brake flaps to a fully deployed position relative to the suction side of the turbine blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine with blades in accordance with aspects of the invention;

FIG. 2 illustrates a longitudinal view of a wind turbine rotor blade with a plurality of air brake flaps aligned span-wise along the blade;

FIG. 3 illustrates a cross-section view of a wind turbine rotor blade with a deployable air brake flap;

FIG. 4 illustrates a perspective view of a portion of a suction side surface of a wind turbine blade with an air brake flap;

FIG. 5 illustrates a cross-sectional view of an embodiment of an air brake flap and actuator in accordance with aspects of the invention;

FIG. 6 illustrates a cross-sectional view of another embodiment of an air brake flap and actuator;

FIG. 7 illustrates a cross-sectional view of still another embodiment of an air brake flap and actuator;

FIG. 8 illustrates a cross-sectional view of a different embodiment of an air brake flap and actuator;

FIG. 9 illustrates a cross-sectional view of another embodiment of an air brake flap and actuator;

FIG. 10 illustrates a cross-sectional view of an embodiment of a vertically deployable air brake flap and actuator;

FIG. 11 illustrates a cross-sectional view of a different embodiment of a vertically deployable air brake flap and actuator; and FIG. 12 is a block diagram of a method embodiment for shutdown of a wind turbine in accordance with aspects of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of a horizontal axis wind turbine 10. It should be appreciated that the wind turbine 10 may be a vertical-axis wind turbine. In the illustrated embodiment, the wind turbine 10 includes a tower 12, a nacelle 14 mounted on the tower 12, and a rotor hub 18 that is coupled to a generator within the nacelle 14 through a drive shaft and gearing. The tower 12 may be fabricated from tubular steel or other suitable material. The rotor hub 18 includes one or more rotor blades 16 coupled to and extending radially outward from the hub 18.

The rotor blades 16 may generally have any suitable length that enables the wind turbine 10 to function according to design criteria. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Referring to FIGS. 1 and 2, the blades 16 include one or more air brake flaps 40 disposed along the leading edge 32 of each respective blade. These air brake flaps 40 are fail-safe devices in that, in the event of loss of power to the wind turbine control system (or power to actuators that control the flaps 40), the flaps 40 automatically deploy to an open position (FIG. 4) to reduce load on the blades 16 and slow or stop the rotor 18. Various embodiments of the air brake flaps 40 and associated actuators are described in greater detail below.

As depicted in FIG. 1, the wind turbine 10 may also include a turbine control system or turbine controller 20 located within the nacelle 14 or at any location on or in the wind turbine 10, or generally at any other suitable location. The controller 20 may include suitable processors and/or other processing functionality configured to control the operational aspects of the wind turbine 10, as well as to functions described herein related to the air brake flaps. For instance, the controller 20 may control the pitch angle of the rotor blades 16, either individually or simultaneously, by transmitting suitable control signals to a pitch drive or pitch adjustment system within the nacelle 14. Further, as the direction of the wind changes, the controller 20 may be configured to control the position of the nacelle 14 relative to a yaw axis via a yaw drive mechanism within the nacelle 14 to position the rotor blades 16 with respect to the wind direction.

Still referring to FIG. 1, the air brake flaps 40 may be actuated and controlled by a controller 54 associated with each of the blades 16 via power/control lines 24. The respective controllers 54 may, in turn, be in communication with the wind turbine controller 20 via the control/power lines 26 for coordinated control of the various air brake flaps 44. The controller 20 may receive any manner of input from various sensors 22 that are appropriately disposed and configured to sense various operating conditions on the blades 16, such as extreme or transient load conditions experienced by the blades 16. At such load conditions, the controller 20, via the power/control lines 26, can actuate any number or combination of the air brake flaps 40 by depowering the flap actuators. In the event of a total loss of power to the controller 20, the air brake flaps 40 will automatically deploy, as mentioned above. In order to maintain the overall balance of the rotor 18 and blades 16, the same number and combination of the air brake flaps 40 on each of the blades 16 may be actuated in unison via their respective control mechanism 54. At the end of the transient load condition, the air brake flaps 40 may be powered-up and returned to their retracted position.

FIG. 3 shows a cross-sectional view of an embodiment of a blade 16 configured with a deployable air brake flap 40. The blade 16 includes a suction side member 30 and a pressure side member 28. The members 28, 30 are joined at a leading edge 32 and a trailing edge 34 from a blade tip to a root. An internal cavity 36 is defined within the blade 16 wherein any manner of structure, control devices, and the like may be located. For example, the rotor blade 16 would typically incorporate structural support members 38 such as a longitudinally extending shear web and respective spar caps attached to the inner surfaces of the suction side 30 and pressure side 28. It should also be appreciated that the rotor blades 16 are not limited to any particular shape or configuration, and that the blades illustrated in the present figures are not meant as a limitation on the overall design and configuration of the blades.

FIGS. 3 and 4 illustrate aspects of the air brake flaps 40. Each of the flaps 40 has a hinged end 46 that pivots relative to the surface of the suction side member 30 via any manner of suitable hinge 48 (FIG. 5). The air brake flap 40 has a free edge 44 that is adjacent to the leading edge 32 of the blade 16. In a retracted or closed position of the air brake flap 40 as depicted in FIG. 2, the flap 40 resides within a recess 42 defined in the upper surface of the suction side member 30 such that the flap 40 is essentially flush with the surface of the suction side member 30. The air brake flap 40 moves from the refracted position to a deployed or open position indicated in FIGS. 3 and 4 such that the air brake flap 40 extends transversely from the suction side member 30 and functions to decrease the aerodynamic load on the blade 16 to slow or stop the rotor 18 (FIG. 1). The air brake flaps 40 are actuated by an actuator 52 (FIG. 3) that holds the air brake flap 40 in the retracted position within the recess 42 in a powered state of the actuator 52. Upon a loss of power to the actuator 52, for example upon receipt of a signal from the controller 54 or loss of power to the wind turbine system controller 20, the actuator releases the air brake flap 40, which then moves to the open position, as discussed in greater detail below.

Referring to FIG. 2, each of the wind turbine blades 16 may have any combination of air brake flaps 40 configured therewith. For example, the blades 16 may have one air brake flap 40, or a series of the air brake flaps 40 disposed span-wise along the leading edge 32 of the blade 16. The plurality of air brake flaps 40 associated with a single blade 16 may be actuated in unison from a single controller 54 or each of the air brake flaps 40 may have a respective controller 54 such that the flaps 40 can be individually actuated.

Various embodiments of an actuator 52 are within the scope and spirit of the invention. For example, referring to FIG. 5, the actuator may be any manner of suitable electrically controlled spring-extend actuator 56. These types of actuators (as well as spring-retract actuators) are well known and are commercially available, and need not be described in detail herein. In general, these spring-extend actuators include an internal spring 58 that, in a powered state of the actuator 56, is retracted. Upon a loss of power to the actuator 56, the spring 58 releases and extends. The spring 58 is coupled to any manner of suitable transfer mechanism, such as a rod 60, that is coupled to the air brake flap 40 via a suitable rod pivot 84.

It should be appreciated that, in an alternative configuration, a conventional spring-retract actuator may also be configured with linkages that cause a transfer of motion to the air brake flap 40 to move the flap 40 to the open position indicated in FIG. 5 upon retraction of the spring 58.

FIG. 6 depicts an embodiment of an actuator 52 wherein an electrically controlled lock 62 is configured to hold the rod 60 with the air brake flap 40 in the retracted position. The lock 62 may be, for example, an electro-magnet 64 that, when energized, attracts and holds a base member 66 attached to the rod 60. Upon de-energizing the electro-magnet 64, the lock 62 releases and the air brake flap 40 is free to move to the open position.

Still referring to FIG. 6, it may be desired in certain embodiments to incorporate a biasing element 68 that serves to provide an initial degree of movement to the air brake flap 40 towards the open position. For example, once the lock 62 releases the rod 60, the biasing element 68, which may be any manner of suitable spring, resilient flap, mechanical actuator, pneumatic actuator, and the like, will move the free end 44 of the air brake flap 40 out of the recess 42 to an extent such that air flow over the suction side member 30 (indicated by the arrows in FIG. 6) impinges on the underside 50 of the air brake flap 40 and forces the air brake flap 40 to the open position.

In the embodiment of FIG. 6, a return spring 70 is also incorporated with the actuator 52. This spring 70 serves to provide a return force to the rod 60 and base 66 such that upon stopping or slowing the rotor to a sufficient degree wherein air flow over the suction side member 30 is relatively negligible, the spring 70 has sufficient force to move the rod 60 and base 66 back into contact with the electro-magnet 64, whereby the lock 62 can be re-energized to again lock the air brake flap 40 in the retracted position.

Although depicted with the embodiment of FIG. 6 (and FIGS. 8 and 9), it should be readily appreciated that the biasing element 68 may be utilized with any of the embodiments of an actuator 52 described herein.

In the embodiment of FIG. 7, the actuator 52 includes a biasing element 68 in the form of a spring that is configured within the actuator to act on the rod 60. This embodiment may include, for example, any manner of mechanical or electrical lock that releases the rod 60 upon loss of power. The biasing spring 68 then provides an initial force to the rod 60 to move the air brake flap 40 to a position such that air flow over the suction side member 30 "catches" under the flap 40 and moves the flap 40 to the fully open position. The return spring 70 has a sufficient force to overcome the force of the biasing spring 68 when the blade 16 has been slowed or stopped.

Referring again to FIG. 6, any one of the air brake flap 40 embodiments herein may also incorporate a stop chord 80 configured on an underside 50 of the flap 40 and attached to a stop block 82 within the internal cavity 36 of the blade 16. The chord 80 defines the degree of relative movement of the flap 40 relative to the suction side member 30 and can be designed with sufficient strength so as to relieve the load from the actuator 52 and rod 60 that would otherwise be required for holding the flap 40 against the force of the air flow over the suction side member 30. Thus, the actuator 52 in this type of configuration need only be designed to move the air brake flap 40 to a position wherein the air flow over the suction side member 30 catches the flap 40 and opens the flap. The stop chord 80 (which may be a cable or other similar member) holds the flap 40 in a static open position against the force of the air flow without regard to the strength or robustness of the actuator 52, which allows for a far less expensive actuator 52.

The embodiment in FIG. 8 depicts an actuator 52 that utilizes a cable 72 attached to the underside 50 of the flap 40 and engaged on an electrically controlled clutch 74. The clutch 74 may be energized through the controller 54 to wind the cable 72 and thus pull the flap 40 into the retracted position within the recess 42 against the biasing element 68. Upon loss of power, the clutch 74 free-wheels and allows the cable 72 to unwind. The free end 44 of the flap 40 is moved into the air stream over the suction side member 30 from the force of the biasing element 68, whereby air flow over the suction side member 30 then moves the flap 40 and attached cable 72 to the open position.

FIG. 9 depicts an embodiment wherein the actuator is a shape memory spring actuator 76. These type of actuators 76 utilize a shape-memory spring 78 that, when energized, tightly winds or coils. Upon loss of power to the spring 78, the spring releases and expands. The spring 78 may be configured with the rod 60 such that expansion of the spring 78 causes the air brake flap 40 to move to the open position, as discussed above. Shape-memory springs and associated actuators are known in the art and are commercially available, and need not be described in detail herein.

FIGS. 10 and 11 depict an embodiment of an air brake flap 40 and associated actuator 52 wherein the air brake flap 40 is vertically deployable relative to the surface of the suction side member 30. The air brake flap 40 has a top end 88 that is flush mounted with the suction side member 30 in the retracted position of the air brake flap 40. In this position, the flap 40 extends into the internal cavity 36 of the blade and, upon release of the actuator 52, is moved to the extended transverse position as indicated in FIGS. 10 and 11.

Still referring to FIGS. 10 and 11, the actuator 52 for the vertically deployed air brake flap 40 may be variously configured as discussed above. For example, in the embodiment of FIG. 10, the actuator 52 may be configured as a shape memory spring actuator 76, as discussed above with respect to the embodiment of FIG. 9.

In the embodiment of FIG. 11, the actuator 52 may be configured as a spring-extend actuator utilizing a spring 58 to move the rod 60 and attached flap 40 to the extended position, as well as an electrical lock 62 as discussed above with respect to the embodiment of FIG. 6. This embodiment may also include any manner of drive mechanism 90, which may be a gear arrangement, motor, and so forth, that functions to return the rod 60 and attached flap 40 to the retracted position wherein the base 66 engages with the electro-magnet 64 upon subsequent re-powering the actuator 52.

It should be understood that the return drive mechanism 90 depicted in FIG. 11 may be incorporated with any of the other embodiments discussed above. For example, a return drive mechanism 90 may be configured with the embodiment of FIG. 5 to reset the spring extend actuator 56 by returning the rod 60 against the force of the spring 58.

It should be appreciated that the present invention also encompasses any manner of wind turbine 10 (FIG. 1) that incorporates one or more wind turbine blades 16 having one or more air flaps 40 as discussed herein.

The present invention also encompasses various method embodiments for controlled shut down of a wind turbine under emergency or expedited procedures utilizing the air brake flaps and fail-safe actuators as described above. Generally, a wind turbine is shut down in a controlled manner via the pitch control system wherein the blades are feathered to a neutral position to bring the rotor hub to a stop, at which time a mechanical brake is generally applied to the main rotor shaft. There may, however, be certain operating conditions that dictate a more expedited or "emergency" shutdown of the wind turbine. Utilization of the brake flaps on the wind turbine blades and fail-safe actuators as described herein is particularly useful in this situation.

Referring to FIG. 12, the method 100 may include detecting any one or combination of operational conditions of the wind turbine that necessitates an expedited or emergency shutdown by means other than the wind turbine's normal pitch control shutdown. For example, an initial step 102 of the illustrated method embodiment 100 may include a determination as to whether or not the wind turbine safety systems are enabled. A wind turbine is generally provided with certain safety features or characteristics that monitor for certain conditions and initiate a shutdown of the wind turbine in the event that one or more of the conditions are met. For example, the wind turbine safety system may initiate braking of the wind turbine for rotor or generator overspeed, excessive vibration, failure of the pitch control system, or a failure of the wind turbine controller system. The safety system generally includes one or redundant pathways or "safety chains" for initiating a shutdown of the wind turbine under any one of these conditions. Step 102 may entail monitoring the status of these safety chains and, in the event of failure of one or more of the chains (which indicates non-enablement of some aspect of the safety system), engaging the fail-safe brake flaps in step 110 by de-powering the fail-safe actuators.

The method 100 may include at step 104 detecting whether or not the wind turbine's pitch control system is operational. If a determination is made that the pitch control system is inoperable, then a controlled shutdown of the wind turbine may be initiated at step 110 by engaging the fail-safe brake flaps.

At step 106, a determination is made as to whether or not a shutdown signal has been generated for the turbine from the main turbine control system. If such a signal has been generated (for any reason), then the wind turbine may be shut down in an expedited manner by engaging the fail-safe brake flaps at step 110.

Another operational condition that may be monitored is the availability of the grid at step 108. Loss of the downstream electrical grid (which effectively includes the ability of the wind turbine to supply power to the grid) is another condition that may necessitate an expedited or emergency shutdown of the wind turbine at step 110. In addition, the wind turbine may receive power from the grid for certain operation functions, such as pitch control, wherein loss of the electrical grid results in loss of these functions. Loss of pitch control because of loss of the electrical grid may be a condition that necessitates actuation of the fail-safe brake flaps.

Still referring to FIG. 12, it can be appreciated that if all of the conditions illustrated in steps 102, 104, 106, and 108 are satisfied, then operation of the wind turbine may continue under step 112 with normal pitch control of the turbine blades via the wind turbine's pitch control system.

One or more of the method embodiments 100 may include additional steps after the wind turbine has been brought to a stop by engagement of the brake flaps. For example, a determination may be made at step 114 as to whether or not the turbine rotor has been brought to a stop or safe idle speed. Under certain conditions, the turbine need not be completely stopped, but may be brought to an idles speed until the blades can be feathered to a shutdown position upon return of the pitch control system. If the turbine rotor has not yet stopped/idled, then such condition is continuously monitored at step 120 until it has been determined that the rotor is stopped. Once the rotor is stopped, then the method proceeds to step 124, discussed below.

In addition to detecting stoppage of the turbine rotor, a determination is made at step 116 as to whether or not the grid is available to the wind turbine. This condition is continuously monitored at step 122. If the grid is available, then the method proceeds to step 118 wherein a determination is made as to whether or not the blades can be feathered with the pitch control system. If this condition can be satisfied, then the method proceeds to step 124.

Step 124 determines the satisfaction of two conditions: whether the turbine rotor has been brought to a stop as set forth in step 114, and whether or not the blades have been feathered to a neutral position. These conditions are monitored at step 126 until they are satisfied. Once the conditions are satisfied, then the turbine is placed in a shutdown condition at step 128 (which may include application of a mechanical brake).

Although not depicted in FIG. 12, it should be appreciated that the fail-safe brake functionality as described herein may be periodically tested. For example, the system may be tested upon each startup of the wind turbine. The system may also be tested according to a set schedule during operation of the wind turbine, for example after a certain number of operational hours.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for shutdown of a wind turbine having one or more wind turbine blades, the method comprising:

detecting an operational condition of the wind turbine that calls for an expedited or emergency shutdown of the wind turbine by means other than normal pitch control shutdown;

upon detection of the operational condition, deploying one or more air brake flaps configured on each of the turbine blades by removing electrical power to a fail-safe actuator operatively coupled to each of the air brake flaps, the fail-safe actuator configured to hold the respective air brake flap at a retracted position relative to a suction side of the turbine blade in a powered state of the fail-safe actuator and to release the air brake flap for automatic deployment to an open position upon loss of electrical power to the fail-safe actuator; and including providing an initial motive force to the air brake flaps upon removing power to the fail-safe actuators to move the air brake flaps to an initial position relative to the suction side of the turbine blade so that airflow over the suction side subsequently acts on the air brake flaps and moves the air brake flaps to a fully deployed position.

2. The method as in claim 1, wherein the detected operational condition indicates an emergency shutdown command from a wind turbine controller operationally configured with the wind turbine.

3. The method as in claim 1, wherein the wind turbine supplies electrical power to or receives electrical power from a grid, the detected operational condition indicating loss of the grid.

4. The method as in claim 1, wherein the air brake flaps are pivotally mounted to the suction side of the turbine blade.

5. A method for shutdown of a wind turbine having one or more wind turbine blades, the method comprising:
   detecting an operational condition of the wind turbine that calls for an expedited or emergency shutdown of the wind turbine by means other than normal pitch control shutdown;
   upon detection of the operational condition, deploying one or more air brake flaps configured on each of the turbine blades by removing power to a fail-safe actuator operatively coupled to each of the air brake flaps, the fail-safe actuator configured to hold the respective air brake flap at a retracted position relative to a suction side of the turbine blade in a powered state of the fail-safe actuator and to release the air brake flap for automatic deployment to an open position upon loss of power to the fail-safe actuator; and
   wherein the detected operational condition indicates that a safety system operationally configured with the wind turbine is not enabled.

6. The method as in claim 5, wherein the wind turbine safety system initiates braking of the wind turbine for rotor or generator overspeed, excessive vibration, failure of the pitch control system, or controller system failure.

7. The method as in claim 5, wherein the detected operational condition indicates loss or malfunction of the pitch control system operationally configured with the wind turbine.

8. A method for shutdown of a wind turbine having one or more wind turbine blades, the method comprising:
   detecting an operational condition of the wind turbine that calls for an expedited or emergency shutdown of the wind turbine by means other than normal pitch control shutdown;
   upon detection of the operational condition, deploying one or more air brake flaps configured on each of the turbine blades by removing power to a fail-safe actuator operatively coupled to each of the air brake flaps, the fail-safe actuator configured to hold the respective air brake flap at a retracted position relative to a suction side of the turbine blade in a powered state of the fail-safe actuator and to release the air brake flap for automatic deployment to an open position upon loss of power to the fail-safe actuator; and
   wherein after deployment of the air brake flaps, the method further comprises detecting when the turbine rotor has stopped and whether the turbine blades can be feathered with pitch control to a neutral position.

9. The method as in claim 8, wherein once the turbine rotor has stopped and pitch control is available, the blades are feathered to the neutral position and the wind turbine is placed in a shutdown state.

10. The method as in claim 9, wherein power is supplied to the fail-safe actuators to retract the air brake flaps once the wind turbine is placed in a shutdown state.

11. The method as in claim 8, including providing a sufficient motive force to the air brake flaps upon removing power to the fail-safe actuators to move the air brake flaps to a fully deployed position relative to the suction side of the turbine blade.

12. The method as in claim 8, wherein the air brake flaps have a top end that is flush mounted with the suction side of the turbine blade in the retracted position of the air brake flaps, the air brake flaps deployable in a generally perpendicular direction from the suction side of the turbine blade.

* * * * *